United States Patent

Magni et al.

Patent Number: 5,270,443
Date of Patent: Dec. 14, 1993

[54] PROCEDURE FOR THE REMOVAL OF CATALYTIC RESIDUES BASED ON ALCL$_3$ AND/OR ITS COMPLEX COMPOUNDS

[75] Inventors: Ambrogio Magni, Paderno d'Adda; Attilio Sioli, Milan; Claudia Andena, Casalpusterlengo; Mario Ponzinibbi, Vizzolo Predabissi, all of Italy

[73] Assignee: Enichem Anic S.R.L., Palermo, Italy

[21] Appl. No.: 855,510

[22] Filed: Mar. 23, 1992

[30] Foreign Application Priority Data

Mar. 26, 1991 [IT] Italy ............. MI 91 A 000810

[51] Int. Cl.$^5$ ............................................... C08F 6/08
[52] U.S. Cl. ..................................... 528/485; 528/499
[58] Field of Search ............................... 528/485, 499

[56] References Cited

U.S. PATENT DOCUMENTS 3,012,022 12/1961 Reed et al. ............................ 528/485
4,369,306 1/1983 Toyota et al. ........................ 528/485

FOREIGN PATENT DOCUMENTS 0035896 9/1981 European Pat. Off. .
412597 2/1991 European Pat. Off. .

Primary Examiner—Joseph L. Schofer
Assistant Examiner—Tom Weber
Attorney, Agent, or Firm—Oblon, Spivak, McClelland, Maier & Neustadt

[57] ABSTRACT

A selective procedure is described for the removal of catalytic residues based on AlCl$_3$ or its complex compounds deriving from the (co) polymerization of olefinic and diolefinic cuts, allowing the production of almost colourless hydrocarbon resins. This procedure involves putting the polymerized mass in contact with organometallic compounds, treating the resulting mixture with water or aqueous solutions, either acidic or basic, and separating the organic phase, which at this point is without inorganic residues.

11 Claims, No Drawings

PROCEDURE FOR THE REMOVAL OF CATALYTIC RESIDUES BASED ON ALCL₃ AND/OR ITS COMPLEX COMPOUNDS

The present invention relates to a method for the removal of catalytic residues of $AlCl_3$ and/or its complex compounds from polymeric products deriving from the polymerization, via Friedel-Crafts, of hydrocarbons or mixtures of ethylenically unsaturated hydrocarbons.

It is well-known that the name Friedel-Crafts refers to a variegated group of reactions all connected by the common use of cationic catalytic systems based on the halides of Al, Fe, Zn, B, Sn and others; among the many, alkylation, the synthesis of ketones, isomerization, polymerization reactions may be cited.

For the purposes of the present invention, the Friedel-Crafts catalysis will be identified by a polymerization reaction induced by catalytic systems based on $AlCl_3$ and/or its complex compounds.

Examples of polymerizations induced by systems based on $AlCl_3$ are: the polymerization of unsaturated hydrocarbon mixtures based on olefinic and diolefinic monomers of the $C_4$, $C_5$ kind and higher monomers of the aliphatic, cycloaliphatic and aromatic kind.

Other examples of polymerization induced by systems based on $AlCl_3$ are the polymerization and copolymerization of natural monomers, such as terpenes, with other unsaturated organic compounds.

These polymerizations are generally carried out in flow reactors, although semi-flow or batch reactors may be used, in the presence of an inert diluent, even if the use of a specific diluent is not strictly necessary, and at temperatures generally higher than 0° C.

These polymerizations allow the preparation of hard and fragile resins, suitable for use in formulations for adhesives, inks or also oils, some of which having intermediate characteristics between resins and oils.

The separation of the polymer from the reaction mixture involves the deactivation and removal of the catalytic residues present. Among the procedures cited in the art are aqueous, acidic, neutral and basic treatments, as specified in U.S. Pat. Nos. 2,335,912, 2,391,293 and 1,938,320; alcoholic and ammoniacal treatments as indicated in U.S. Pat. Nos. 1,939,932 and 2,287,535.

The main disadvantages of these procedures are the production of emulsions, when aqueous solutions are used, and the contamination of the hydrocarbon solvent when alcohol is used, which must be removed before the solvent is used again to prevent the formation of stable, inactive complex compounds of the $AlCl_3$.

Other known procedures involve the use of oxides and hydroxides, such as CaO, $Ca(OH)_2$, MgO and $Mg(OH)_2$, possibly in the presence of certain dosages of water, as described in U.S. Pat. No. 2,734,892. In this case the disadvantages are determined by the necessity and difficulties of filtrating a solid residue which may be present in a gel-like form.

In a previous Patent Application in the name of the present Applicant (Italy 21.493 A/89), a new method was described for the removal of catalytic residues based on aluminium trichloride from polymeric mixtures which involve the use of organometallic reagents, preferably a metal alkyl or metal hydride. The method in accordance with this Patent Application involves, in particular, treatment of the mass resulting from the polymerization reaction with an organometallic reagent, selected from metal alkyls and metal hydrides of at least one metal preferably chosen from Al, Fe, Co, Ni, V; among which it is preferable to use at least one organometallic derivative of aluminium such as, for example, $AlEt_3$, $AlEt_2Cl$, $Al(i-But)_2H$.

This method, as well as providing the effective removal of the catalytic residues from the polymerized mixtures, also allows the production of resins having a higher thermal stability and lighter colour with respect to similar resins not subjected to treatment with organometallic derivatives. The colour residue of these resins, although slight, makes them not always available for the production of end products, for which almost complete absence of colouring is sometimes required.

On the other hand, it is well-known that the products obtained from the polymerization of ethylenically unsaturated hydrocarbons and/or their mixtures with Friedel-Crafts catalysts have a colour which varies from light yellow to brown, depending on the composition of the polymerized charge and on the polymerization conditions, which makes them unsuitable for use in formulations for numerous commercial applications for which the absence of colouring is required. Among the many procedures cited in the known art for improving the colour of hydrocarbon resins, Brit. Patent 835.788 demonstrates that the colour can be advantageously lightened by controlling the water content of the hydrocarbon fractions subjected to polymerization and the quantity of Friedel-Crafts catalyst used.

More recently, in E.P. Application 82301558.1, a procedure is claimed for the production of light-coloured resins which involves controlling the content of cyclodienic monomers in the charge to values lower than 0.5% by weight. Aromatic resins having a light colour and high thermal stability can be obtained by putting the charge to be polymerized in contact with a dienophilic product before polymerization (US Patents 4,102,843 and 4,230,840).

More specifically, basically colourless resins can be obtained by the cationic polymerization of pure monomers. For example, beta-pinene is transformed into a colourless resin by polymerization with catalytic quantities of an organometallic compound of aluminium not containing halogen and activating the system by the addition of controlled quantities of water and subsequent addition of an organic halide (E.P. Application 84308674.5).

Light-coloured resins can also be obtained by means of the catalytic hydrogenation of hydrocarbon resins produced by cationic polymerization with Friedel-Crafts catalysts (UK 1,176,443); however this method has evident disadvantages, the most important ones being a change in the main physical-chemical and behaviour characteristics and the rapid loss of activity of the hydrogenation catalyst.

It is consequently evident from the known art that a general solution to the necessity of having colourless hydrocarbon resins, obtained by the cationic polymerization of unsaturated hydrocarbon mixtures, has not yet been found to satisfy the growing demands for quality in the various fields of application.

The present invention therefore relates to a procedure of a completely general nature for the production of colourless and thermally stable resins from the polymerization products via Friedel-Crafts of ethylenically unsaturated hydrocarbon mixtures, a procedure which overcomes the above-mentioned draw-backs of the known art; the present invention also relates to the resins thus obtained.

It has in fact been surprisingly found that the treatment of the reacted masses resulting from the polymerization via Friedel-Crafts with a specific organometallic compound, such as diisobutyl-aluminium-monohydride and/or diethyl-aluminium-monohydride under suitable conditions, produces basically colourless hydrocarbon resins having a high thermal stability, with all the other physical-chemical and behaviour characteristics of the resins resulting from the polymerization remaining practically unaltered.

These two organometallic compounds are in fact responsible for the elimination of the catalytic residues present in the polymeric products obtained via Friedel-Crafts, as are also the other organometallic compounds described in the above-mentioned Italian Patent Application No. 21493 A/89, but with the additional faculty of producing basically colourless or very lightly-coloured resins with a high thermal stability; all the other physical-chemical and behaviour characteristics remaining practically unaltered by the use of these organometallic compounds.

In accordance with this, the first aspect of the present invention relates to a method for the purification of catalytic residues and the decolourizing of polymeric resins obtained by the polymerization of mixtures of ethylenically unsaturated hydrocarbons, which includes the following basic operations:

treatment of the polymerization mixture with diisobutyl-aluminium-monohydride and/or diethyl-aluminium-monohydride;

treatment of the resulting mixture with water or an acidic or basic aqueous solution;

separation and recovery of the required organic phase.

With this procedure it is possible to obtain colourless or very lightly-coloured resins having a high thermal stability, which naturally form an integrant part of the present invention.

The treatment of the mixture resulting from the polymerization reaction with the above organometallic derivative is generally carried out at temperatures ranging from $-20°$ C. to $+120°$ C., although it can also be carried out within a range of $+20°$ C. and $+70°$ C. and preferably at room temperature.

The quantity of organometallic reagent used is related to the quantity of Friedel-Crafts catalyst used in the polymerization. A molar ratio Al-organometallic/Friedel-Crafts catalyst which is higher than 0.2 can be used, although to enhance the effects of the treatment, it is preferable to operate with a molar ratio Al-organometallic/Friedel-Crafts catalyst which is higher than 0.5.

The reaction pressure is not a vital factor and can be either subatmospheric, atmospheric or superatmospheric. The reaction is generally carried out at the autogenous pressure produced in the reactor under the required operating conditions. The reaction time is also not of paramount importance and the times may vary from a few minutes to 2 or more hours, while the progressive clearing of the reaction mass takes place. The treatment may be carried out in flow, semi-flow or batch reactors.

The organometallic derivative can be used both in its pure state or in a solution diluted in an inert diluent. Typical examples of inert diluents are aliphatic hydrocarbons such as pentane, hexane and heptane and aromatic hydrocarbons such as toluene and benzene.

The resulting product is then treated with an equal volume of water or aqueous solution of an acid or base, preferably having a concentration of 0.5–5 N of sodium hydroxide, at the same temperature at which the reaction was carried out with the organometallic derivative or, preferably, at room temperature and for times ranging from 5 minutes to 1 hour under vigorous stirring. Treatment with a normal aqueous solution of sodium hydroxide is preferred.

The decanted organic phase is then distilled in a flow of steam heated to 250° C. and in an inert nitrogen atmosphere to separate the volatile organic residues from the resin.

Having described the general aspects of this invention, the following examples have the sole purpose of illustrating some of the details but are in no way limiting.

All the compositions and percentages indicated, if not otherwise specified, are expressed by weight.

EXAMPLE 1

850 g of a selected steam-cracking cut of hydrocarbon monomers, having the composition shown in column (I) of Table are charged into a glass reactor having a volume of 2 litres, equipped with a cooling jacket and mechanical stirrer.

Maintaining the temperature of the reagent mixture at between $+15°$ and $+30°$ C. by the circulation of a cooling liquid, 10.2 g of $AlCl_3$ (76 mmoles), in a complex with HCl and xylol and prepared separately by bubbling hydrochloric acid into a suspension of aluminium trichloride and xylol in a molar ratio of 1:1, are charged into the reactor under stirring; the mixture is left to react for 40 minutes.

The polymerized mixture is then transferred to a 3 litre glass flask, equipped with a mechanical stirrer and containing 800 g of a 4 molar aqueous solution of sodium hydroxide under vigorous stirring. After 30 minutes of treatment with the soda, the stirring is stopped and the organic phase is left to decant from the aqueous phase.

The resin is then separated from the polymeric solution by stripping the volatiles in a steam flow at 250° C.

The properties of the resin obtained are shown in Table 2.

EXAMPLE 2

850 g of the hydrocarbon cut having the composition shown in column (I) of Table 1, are polymerized under the same conditions as described in Example 1.

At the end of the polymerization, 39 ml of a 1 molar solution of diisobutyl-aluminium-monohydride in hexane are added to the polymerized mixture and left to react for 15 minutes keeping the temperature at $+20°$ C.

The clarified mixture, after the treatment with diisobutyl-aluminium-monohydride, is then transferred to a 3 liter glass flask equipped with a mechanical stirrer and containing 800 g of a 4 molar aqueous solution of sodium hydroxide under vigorous stirring.

After 30 minutes of treatment with the soda, the stirring is stopped and the organic phase is left to decant from the aqueous phase; the resin is then separated from the filtered organic phase by stripping the volatiles in a steam flow at 250° C.

The properties of the resin obtained are shown in Table 2.

EXAMPLE 3

The same procedure is used as described in Example 2, using 77 ml of the 1 molar solution of diisobutyl-aluminium-monohydride.

The properties of the resin obtained are shown in Table 2.

EXAMPLE 4

The same procedure is used as described in Example 2, using 154 ml of the 1 molar solution of diisobutyl-aluminium-monohydride.

The properties of the resin obtained are shown in Table 2.

EXAMPLES 5-6-7

As in examples 2-3-4, using diethyl-aluminium-monohydride instead of diisobutyl-aluminium-monohydride.

The properties of the resins obtained are shown in Table 2.

As examples of less effective organometallic derivatives with respect to the alkyl-aluminium-hydrides cited above, the following examples are shown with aluminium-trialkyls and aluminium-monochlorodiethyl.

EXAMPLES 8-9-10

As in examples 2-3-4, using aluminium-triisobutyl instead of diisobutyl-aluminium-monohydride.

The properties of the resins obtained are shown in Table 3.

EXAMPLES 11—12 13

As in examples 2-3-4, using aluminium-triethyl instead of diisobutyl-aluminium-monohydride.

The properties of the resins obtained are shown in Table 3.

EXAMPLES 14-15-16

As in examples 2-3-4, using aluminium-monochlorodiethyl instead of diisobutyl-aluminium-monohydride.

The properties of the resins obtained are shown in Table 4.

As examples where unsaturated fractions are used which are different from those of examples 1 to 16, the following examples cite polymerizations of fractions of terpene and piperylene with subsequent treatment with diisobutyl-aluminium-monohydride.

EXAMPLE 17

850 g of a mixture containing beta-pinene and having the composition shown in column (III) of Table 1, are charged into a 2 litre glass reactor, equipped with a cooling jacket and mechanical stirrer. The mixture is polymerized at a temperature ranging from 35° to 78° C. by adding 1.04 g of AlCl$_3$ (7.8 mmoles) complexed with HCl and xylol, prepared according to the procedure described in Example 1.

After 50 minutes, the polymerized mixture is transferred to a 3 liter glass flask equipped with a mechanical stirrer and containing 800 g of a 4 molar aqueous solution of sodium hydroxide under vigorous stirring. After 30 minutes of treatment with the soda, the stirring is stopped and the organic phase is left to decant from the aqueous phase. The resin is then separated from the polymeric solution by stripping the volatiles in a steam flow at 250° C.

The properties of the resin obtained are shown in Table 5.

EXAMPLE 18

850 g of a mixture containing beta-pinene having the composition shown in column (III) of Table 1, are polymerized under the same conditions described in Example 17.

At the end of the polymerization, 15.5 ml of a 1 molar solution of diisobutyl-aluminium-monohydride in hexane are added and the mixture is left to react for 15 minutes at a constant temperature of +30° C.

The mixture clarified by the treatment with diisobutyl-aluminium-monohydride is then transferred to a 3 liter glass flask equipped with a mechanical stirrer and containing 800 g of a 4 molar aqueous solution of sodium hydroxide under vigorous stirring. After 30 minutes of treatment with the soda, the stirring is stopped and the organic phase is left to decant from the aqueous phase. The resin is separated from the organic phase, after settling, by stripping the volatiles in a steam flow at 250° C.

The properties of the resin obtained are shown in Table 5.

EXAMPLE 19

As in Example 2, using 850 g of a mixture having the composition shown in column (II) of Table 1.

The properties of the resin obtained are shown in Table 5.

EXAMPLE 20

As in Example 4, using 850 g of a mixture having the composition shown in column (II) of Table 1.

The properties of the resin obtained, which is practically colourless, are shown in Table 5.

TABLE 1

| Components | (I) (% weight) | (II) (% weight) | (III) (% weight) |
|---|---|---|---|
| 1-butene + isobutene | 1.60 | — | — |
| 1,3 butadiene | 2.98 | — | — |
| n-butane | 0.32 | — | — |
| trans-2-butene | 0.99 | — | — |
| cis-2-butene | 1.28 | — | — |
| 1,2-butadiene | 0.40 | — | — |
| 3-methyl-1-butene | 2.11 | — | — |
| isopentane | 7.72 | — | — |
| 1,4-pentadiene | 5.75 | — | — |
| 2-butine | 0.74 | — | — |
| 1-pentene | 10.54 | 0.88 | — |
| 2-methyl-1-butene | 2.90 | 0.22 | — |
| n-pentane | 18.56 | 1.89 | — |
| isoprene | 10.99 | 0.17 | — |
| trans-2-pentene | 7.50 | 0.70 | — |
| cis-2-pentene | 3.50 | 0.73 | — |
| 2-methyl-2-butene | 1.85 | 40.21 | — |
| trans-1,3-pentadiene | 6.81 | 10.57 | — |
| cyclopentadiene | 0.94 | 0.28 | — |
| cis-1,3-pentadiene | 3.49 | 7.80 | — |
| cyclopentene | 5.70 | 5.04 | — |
| hexane | — | 28.45 | — |
| xylene | — | — | 71.83 |
| beta-pinene | — | — | 23.29 |
| various terpenes | — | — | 4.88 |
| various saturated products | 3.33 | 3.06 | — |

TABLE 2

| Example | (1) | (2) | (3) | (4) | (5) | (6) | (7) |
| --- | --- | --- | --- | --- | --- | --- | --- |
| $AlCl_3$, mmoles | 76.7 | 76.7 | 76.7 | 76.7 | 76.7 | 76.7 | 76.7 |
| $Al(iBu)_2H$, mmoles | — | 39.0 | 77.0 | 154.0 | — | — | — |
| $Al(Et)_2H$, mmoles | — | — | — | — | 39.0 | 77.0 | 154.0 |
| Charge, g | 850 | 850 | 850 | 850 | 850 | 850 | 850 |
| Polym. temp. (°C.) | 15–30 | 15–28 | 15–24 | 15–25 | 15–27 | 15–31 | 15–26 |
| Resin, g | 281 | 272 | 274 | 295 | 283 | 290 | 298 |
| Softening Point Resin (ASTM E28) (°C.) | 103 | 101 | 101 | 104 | 99 | 101 | 102 |
| Mn, g/mol (GPC) | 1095 | 1136 | 1109 | 1044 | 1078 | 1057 | 1119 |
| Gardner colour of Resin (ASTM D1544) (1) | 7+ | 3– | 1+ | <1 | 3+ | 2– | 1 |
| Gardner colour of Resin 3 h/150° C. (1) | 12 | 5+ | 4 | 4– | 7– | 5+ | 5 |

(1) measured in a 50% by weight solution in toluene.

TABLE 3

| Example | (1) | (8) | (9) | (10) | (11) | (12) | (13) |
| --- | --- | --- | --- | --- | --- | --- | --- |
| $AlCl_3$, mmoles | 76.7 | 76.7 | 76.7 | 76.7 | 76.7 | 76.7 | 76.7 |
| $Al(iBu)_3$, mmoles | — | 39.0 | 77.0 | 154.0 | — | — | — |
| $Al(Et)_3$, mmoles | — | — | — | — | 39.0 | 77.0 | 154.0 |
| Charge, g | 850 | 850 | 850 | 850 | 850 | 850 | 850 |
| Polym. temp. (°C.) | 15–30 | 15–22 | 15–25 | 15–21 | 15–28 | 15–28 | 15–24 |
| Resin, g | 281 | 265 | 281 | 273 | 279 | 288 | 293 |
| Softening Point Resin (ASTM E28) (°C.) | 103 | 104 | 100 | 99 | 101 | 104 | 102 |
| Mn, g/mol (GPC) | 1095 | 1064 | 1083 | 1102 | 1049 | 1115 | 1077 |
| Gardner colour of Resin (ASTM D1544) (1) | 7+ | 7+ | 6+ | 3 | 7 | 7– | 4– |
| Gardner colour of Resin 3 h/150° C. (1) | 12 | 11+ | 11+ | 7 | 12– | 12+ | 8+ |

(1) measured in a 50% by weight solution in toluene.

TABLE 4

| Example | (1) | (14) | (15) | (16) |
| --- | --- | --- | --- | --- |
| $AlCl_3$, mmoles | 76.7 | 76.7 | 76.7 | 76.7 |
| $Al(Et)_2Cl$, mmoles | — | 39.0 | 77.0 | 154.0 |
| Charge, g | 850 | 850 | 850 | 850 |
| Polym. temp. (°C.) | 15–30 | 15–31 | 15–27 | 15–28 |
| Resin, g | 281 | 296 | 293 | 265 |
| Softening Point Resin (ASTM E28) (°C.) | 103 | 101 | 103 | 98 |
| Mn, g/mol (GPC) | 1095 | 1074 | 1077 | 1103 |
| Gardner colour of resin (ASTM D1544) (1) | 7+ | 8– | 6+ | 6 |
| Gardner colour of Resin 3 h/150° C. (1) | 12 | 12 | 12– | 10+ |

(1) measured in a 50% by weight solution in toluene.

TABLE 5

| Example | (17) | (18) | (19) | (20) |
| --- | --- | --- | --- | --- |
| $AlCl_3$, mmoles | 7.8 | 7.8 | 76.7 | 76.7 |
| $Al(iBu)_2H$, mmoles | — | 15.5 | 39.0 | 153.4 |
| Charge, g | 850 | 850 | 850 | 850 |
| Polym. temp. (°C.) | 35–78 | 35–91 | 15–23 | 15–29 |
| Resin, g | 178 | 185 | 258 | 271 |
| Softening Point Resin (ASTM E28) (°C.) | 115 | 111 | 93 | 88 |
| Mn, g/mol (GPC) | 952 | 973 | 1034 | 1079 |
| Gardner colour of Resin (ASTM D1544) (1) | 2+ | <1 | 3– | 1– |
| Gardner colour of Resin 3 h/150° C. (1) | 6+ | 3 | 5+ | 4 |

(1) measured in a 50% by weight solution in toluene.
(17) and (18) examples with beta-pinene
(19) and (20) examples with 2-methyl-2-butene and piperylene.

We claim:

1. A method for the removal of catalytic residues and the simultaneous decolouring of polymeric resins, obtained by polymerizing via Friedel-Crafts mixtures of ethylenically unsaturated hydrocarbons, including the following basic operations:
   a) treatment of the polymerization mixture with diisobutyl-aluminium-monohydride and/or diethyl-aluminium-monohydride at a temperature from about 20° C. to about 70° C.
   b) treatment of the resulting mixture with water or an acidic or basic aqueous solution;
   c) separation and recovery of the organic phase required.

2. The method for the removal of catalytic residues and the simultaneous decolouring of polymeric resins, in accordance with claim 1, wherein the treatment of the polymerization mixture with diisobutyl-aluminium-monohydride and/or diethyl-aluminium-monohydride is carried out in the presence of a quantity of an organometallic compound in a molar ratio with respect to the Friedel-Crafts catalyst which is higher than 0.2.

3. The method for the removal of catalytic residues and the simultaneous decolouring of polymeric resins, in accordance with claim 2 wherein the molar ratio referred to therein is higher than 0.5.

4. A method in accordance with claim 1, wherein the treatment of the mixture referred to in point b) is carried out with an acid or base solution having a concentration ranging from 0.5 to 5.0 N.

5. A method in accordance with claim 6, wherein the treatment is preferably carried out with a normal solution of sodium hydroxide.

6. The method according to claim 1 wherein the polymerization mixture is treated with diisobutyl-aluminum-hydride.

7. The method according to claim 1 wherein the polymerization mixture is treated with diethyl-aluminum-hydride.

8. The method according to claim 6 wherein step (a) occurs at about room temperature.

9. The method according to claim 7 wherein step (a) occurs at about room temperature.

10. The method according to claim 1 wherein the polymerization mixture is treated with diisobutyl-aluminum-hydride at about 20° C.

11. The method according to claim 1 wherein the polymerization mixture is treated with diethyl-aluminum-hydride at about 20° C.

* * * * *